United States Patent
Dunjic et al.

(10) Patent No.: US 11,888,854 B2
(45) Date of Patent: Jan. 30, 2024

(54) SYSTEMS AND METHODS FOR AUTHENTICATING END USERS OF A WEB SERVICE

(71) Applicant: The Toronto-Dominion Bank, Toronto (CA)

(72) Inventors: Milos Dunjic, Oakville (CA); David Samuel Tax, Toronto (CA); Kushank Rastogi, Toronto (CA); Asad Joheb, Toronto (CA); Lisa Marie Bast, Toronto (CA); Vipul Kishore Lalka, Oakville (CA)

(73) Assignee: The Toronto-Dominion Bank, Toronto (CA)

( * ) Notice: Subject to any disclaimer, the term of this patent is extended or adjusted under 35 U.S.C. 154(b) by 337 days.

(21) Appl. No.: 17/409,084

(22) Filed: Aug. 23, 2021

(65) Prior Publication Data
US 2023/0053385 A1 Feb. 23, 2023

(51) Int. Cl.
*H04L 9/40* (2022.01)
*G06F 21/62* (2013.01)
*G06F 21/31* (2013.01)

(52) U.S. Cl.
CPC ............ *H04L 63/102* (2013.01); *G06F 21/31* (2013.01); *G06F 21/6209* (2013.01)

(58) Field of Classification Search
CPC ....... H04L 63/102; H04L 63/08; G06F 21/31; G06F 21/6209
USPC .............................................................. 726/3
See application file for complete search history.

(56) References Cited

U.S. PATENT DOCUMENTS

| | | | |
|---|---|---|---|
| 8,055,558 B2 | 11/2011 | Yuan et al. | |
| 8,239,326 B1 | 8/2012 | Yuen et al. | |
| 8,412,626 B2 | 4/2013 | Hirson et al. | |
| 8,423,466 B2 | 4/2013 | Lanc | |
| 8,751,381 B2 | 6/2014 | Musser et al. | |
| 9,626,664 B2 | 4/2017 | Bouey et al. | |

(Continued)

FOREIGN PATENT DOCUMENTS

KR 100352123 B2 * 12/2002 ............. G06F 17/60

OTHER PUBLICATIONS

Chow et al.: "Authentication in the Clouds: A Framework and its Application to Mobile Users", published in CCSW 10, pp. 1-6, URL link: https://www.cs.umd.edu/~elaine/docs/ccsw10.pdf; publication date: Oct. 8, 2010.

*Primary Examiner* — Jacob Lipman
(74) *Attorney, Agent, or Firm* — Rowand LLP

(57) ABSTRACT

A computer-implemented method is disclosed. The method includes: receiving an authentication request to authenticate a first entity with a first service; in response to receiving the authentication request: identifying an access-restricted first data record associated with the first entity; generating a message associated with a first transfer of resources between the first data record and a designated second data record, the message identifying one of the first and second data records as a recipient data record for the first transfer and defining a first quantity of resources to transfer; and transmitting the message to a first server associated with the first entity, the first server requiring user authentication to access the message; determining a completion status of the first transfer; and generating a response to the authentication request based on the completion status of the first transfer.

20 Claims, 8 Drawing Sheets

(56) References Cited

U.S. PATENT DOCUMENTS

| | | |
|---|---|---|
| 9,769,134 B2 | 9/2017 | Dominguez et al. |
| 2011/0178926 A1* | 7/2011 | Lindelsee .............. G06Q 20/40 |
| | | 705/44 |
| 2011/0213671 A1 | 9/2011 | Hirson et al. |
| 2014/0207687 A1 | 7/2014 | Rammal |

* cited by examiner

SYSTEMS AND METHODS FOR AUTHENTICATING END USERS OF A WEB SERVICE

TECHNICAL FIELD

The present application relates to data security and, more particularly, to systems and methods for managing computer access control systems.

BACKGROUND

Web services support various different types of information exchange. Access to a web service may be limited to only those entities that are expressly authorized to access the service. In particular, an access control system may be operated for enforcing security and privacy requirements of a web service. For example, a server hosting a web service (e.g., a web server) may define an authorization policy, which specifies the operations that different end users are allowed to execute when accessing the web service, and an access control system for the web service may configure user permissions to enforce the authorization policy. An access control system may be implemented as an integral component of a web server for authenticating end users. Alternatively, a standalone third-party access control system may handle end user authentication for a plurality of web services.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
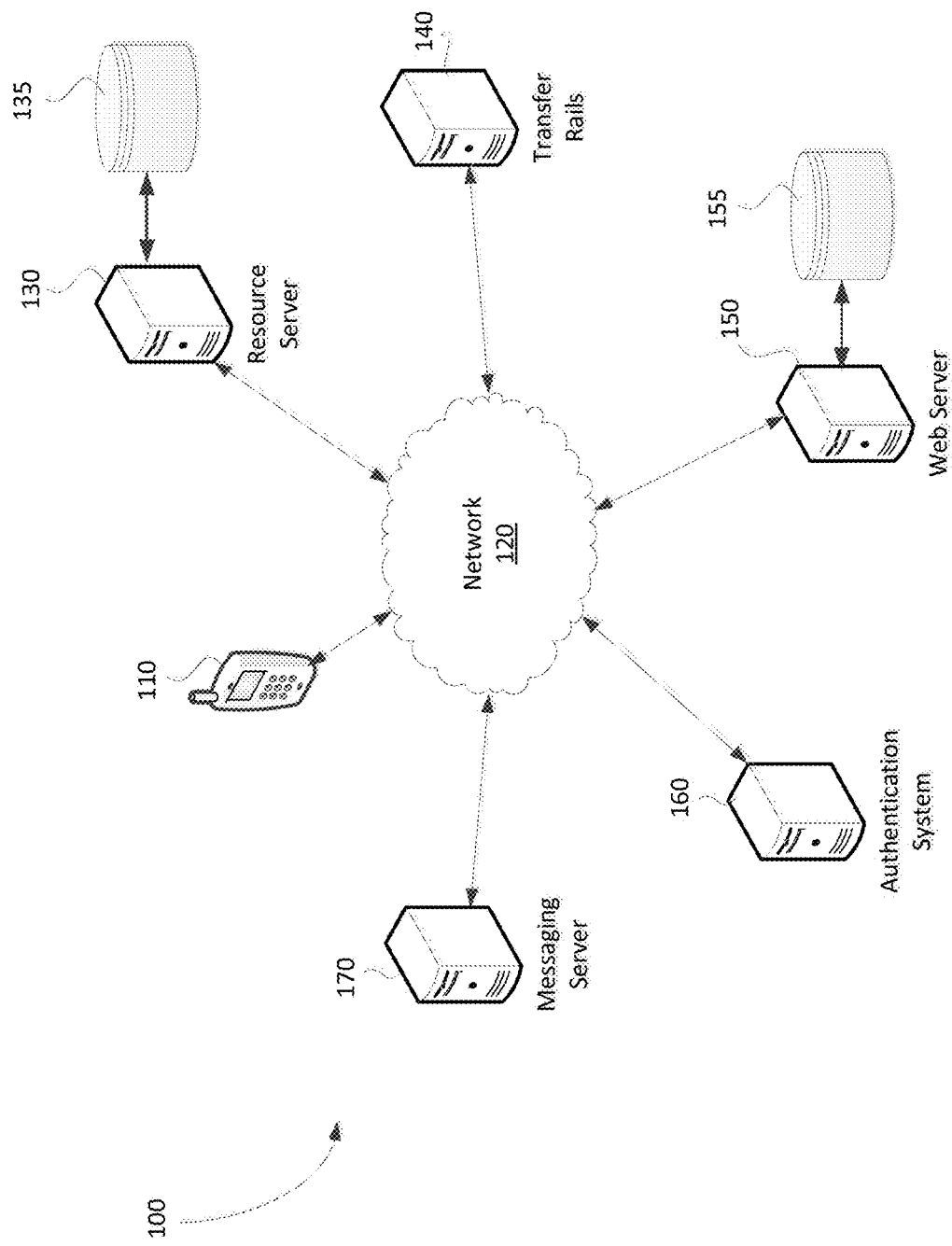
FIG. 1 is a schematic diagram illustrating an operating environment of an example embodiment.

In an aspect, the present disclosure describes a computing system. The computing system includes a processor, a communications module coupled to the processor, and a memory coupled to the processor. The memory stores instructions that, when executed, configure the processor to: receive an authentication request to authenticate a first entity with a first service; in response to receiving the authentication request: identify an access-restricted first data record associated with the first entity; generate a message associated with a first transfer of resources between the first data record and a designated second data record, the message identifying one of the first and second data records as a recipient data record for the first transfer and defining a first quantity of resources to transfer; and transmit the message to a first server associated with the first entity, the first server requiring user authentication to access the message; determine a completion status of the first transfer; and generate a response to the authentication request based on the completion status of the first transfer.

In some implementations, the message may comprise a resource transfer request to cause the first transfer of resources to be initiated from the first data record to the second data record and determining the completion status of the first transfer may include: receiving a response message associated with the resource transfer request; and validating the response message.

In some implementations, validating the response message may include: verifying that the response message is associated with the first entity; and determining that the response message designates the first quantity of resources to be transferred to the second data record.

In some implementations, the first server may be a messaging server associated with a messaging service that is independent of the first data record.

In some implementations, the first server may be a resource server associated with the first data record and the first transfer may comprise a transfer of resources via a real-time transfer rail.

In some implementations, determining the completion status of the first transfer may include detecting transfer failure of the first transfer and the response to the authentication request may include a notification of the transfer failure.

In some implementations, the transfer failure of the first transfer may comprise at least one of: an authentication failure of the entity at a messaging server associated with a messaging service; or an authentication failure of the entity at a resource server associated with the first data record.

In some implementations, detecting the transfer failure of the first transfer may include determining that a time-out condition associated with the first transfer has occurred.

In some implementations, the message may comprise a transfer initiation message for transferring the first quantity of resources from the second data record to the first data record and determining the completion status of the first transfer may include determining that the first quantity of resources is received at the first data record.

In some implementations, the transfer initiation message may identify the first data record as an exclusive recipient data record.

In another aspect, the present disclosure describes a computer-implemented method. The method includes: receiving an authentication request to authenticate a first entity with a first service; in response to receiving the authentication request: identifying an access-restricted first data record associated with the first entity; generating a message associated with a first transfer of resources between the first data record and a designated second data record, the message identifying one of the first and second data records as a recipient data record for the first transfer and defining a first quantity of resources to transfer; and transmitting the message to a first server associated with the first entity, the first server requiring user authentication to access the message; determining a completion status of the first transfer;

and generating a response to the authentication request based on the completion status of the first transfer.

In yet another aspect, a non-transitory computer readable storage medium is disclosed. The computer readable storage medium contains instructions thereon which, when executed by a processor, configure the processor to: receive an authentication request to authenticate a first entity with a first service; in response to receiving the authentication request: identify an access-restricted first data record associated with the first entity; generate a message associated with a first transfer of resources between the first data record and a designated second data record, the message identifying one of the first and second data records as a recipient data record for the first transfer and defining a first quantity of resources to transfer; and transmit the message to a first server associated with the first entity, the first server requiring user authentication to access the message; determine a completion status of the first transfer; and generate a response to the authentication request based on the completion status of the first transfer.

Other aspects and features of the present application will be understood by those of ordinary skill in the art from a review of the following description of examples in conjunction with the accompanying figures. Example embodiments of the present application are not limited to any particular operating system, system architecture, mobile device architecture, server architecture, or computer programming language.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, the terms "transferor" and "transferee" may be used interchangeably with "sender" and "recipient", respectively, in the context of describing transfers of resources. Specifically, a transferor of a resource transfer will be understood to be an entity that sends, or causes to be sent, certain resources to a transferee/recipient. The transferor may send (or cause to be sent) the resources in response to receiving a "resource transfer request". As will be described in greater detail below, a resource transfer request may indicate, at least, a designated transferor, an intended recipient, and a quantity of resources that is requested to be transferred from the transferor to the recipient.

In the present application, the term "resource transfer request data" refers broadly to data that is included in a request for resources to be transferred from at least one transferor computing system to at least one transferee computing system. A resource transfer request may be generated by a transferor or transferee and may include information such as identity of the transferee, a designated resource account and/or data record(s) associated with the transferee, quantum of resources requested to be transferred, requested time or schedule for the transfer, and a unique transfer identifier. The resource transfer request may be received and processed by the transferor (or a computing system associated with a transferor), and the requested transfer may be initiated in accordance with the resource transfer request data.

Web services generally require user authentication. That is, authentication is required in order for end users to access their accounts with a web service. A user account with a web service is an account intended to represent an end user that needs to authenticate and be authorized to access data associated with the service. Specifically, a user account represents defined privileges for an end user to access various features provided by a web service.

Account data for a user account at a web service typically includes user identifying information, such as messaging (e.g., email, SMS, etc.) addresses, bank account information, and the like, that represent external accounts of the end user. As used herein, an "external account" refers to an account with a service/application that is external to and independent of the first service. For example, when a user signs up for a web service, they may be required to input identifying information that is tied to one or more external accounts associated with the user. In particular, a user's external accounts and account information associated therewith may be linked to the user account at the web service. An effective access control system is crucial for ensuring that account data, which may include external account information, is protected from unauthorized access (e.g., access by unauthorized entities).

In some cases, user access of a web service may involve a transfer of resources. For example, a pay-per-use service (e.g., a patent search service) may require users to authenticate to the service and to provide payment for using the service/product. More generally, in order to access a web service, an end user may be required to authenticate to the service and to cause a transfer of the user's resources in exchange for using the service. Various types of resources, such as computing resources (e.g., processing units, memory, file storage), electronic data, etc., may be transferred.

Typically, the processing of resource transfers in connection with use of a web service is performed separately and independently of access control for the web service. For example, a payment (or other "real-time") transfer that is directed to a merchant associated with a web service may be processed independently of authentication of end users at the web service. A first system or entity may be tasked with handling payments associated with using the service, while a second system/entity may be tasked with authenticating end users. Having separate systems for processing resource transfers and access control may lead to inefficient use and duplicative allocation of computing resources for said systems. Furthermore, such independent processing may result in a time delay between when an end user is authenticated to the web service and when payment that is commensurate with the end user's use of the service/product is processed.

The disclosed technology of the present application represents improvements in security for web services and, more particularly, improved techniques for authenticating end users of web services. The present technology represents improvements over prior access control systems which handled resource transfers (e.g., payments) and authentication independently.

An authentication system that leverages external account information for multi-factor authentication is proposed. Specifically, the present application describes a mechanism for authenticating end users of a web service by verifying account ownership of external accounts (e.g., resource accounts, messaging accounts, and the like) that are associated with user accounts at a web service. The authentication system handles requests to authenticate users requesting access to a web service. Upon receiving an authentication request, the system generates a message associated with a transfer of resources in connection with an external account of the access requesting entity and transmits the generated message to a server associated with the requesting entity. The message may, in some embodiments, be a message associated with a resource transfer request (e.g., a request for payment). After the message is sent, the system determines a completion status of the resource transfer. A response to the authentication request is generated by the system based on the completion status of the resource transfer. In particular, if the resource transfer is determined to have been completed successfully, the requesting entity associated with the resource transfer may be authenticated to the web service.

FIG. 1 is a schematic diagram illustrating an operating environment of an example embodiment. In particular, FIG. 1 illustrates exemplary components of a system 100 for controlling user access to web services. As a specific example, the system 100 may be implemented to facilitate processing of requests to authenticate end users of a web service.

As illustrated, the resource server 130 (which may also be referred to as a resource management system) and one or more client devices 110 communicate via the network 120. The client device 110 is a computing device. For example, the client device 110 may be a device of an entity having resources that are associated with the resource server 130. The client device 110 may take a variety of forms including, for example, a mobile communication device such as a smartphone, a tablet computer, a wearable computer such as a head-mounted display or smartwatch, a laptop or desktop computer, or a computing device of another type.

The resource server 130 may track, manage, and maintain resources, make lending decisions, and/or lend resources for a plurality of clients. The resources may, for example, include computing resources, such as memory or processor cycles. By way of further example, the resources may include stored value, such as fiat currency, which may be represented in one or more databases. For example, as shown in FIG. 1, the resource server 130 may be coupled to a database 135, which may be provided in secure storage. The secure storage may be provided internally within the resource server 130 or externally; the secure storage may, for example, be provided remotely from the resource server 130. In some embodiments, the secure storage may include one or more data centers. The data centers may, for example, store data with bank-grade security.

The resource server 130 may include a resource request processing engine (not shown in FIG. 1). A resource request processing engine may be implemented to automatically process resource transfer requests that are received at a resource server. Specifically, the resource request processing engine may be configured to process requests to transfer resources that are associated with one or more resource accounts managed by the resource server 130. The resource request processing engine may process resource transfer requests in accordance with defined handling actions. For example, the resource request processing engine may be configured to automatically process resource transfer requests without manual intervention by related entities (e.g., a resource server administrator, clients associated with the resource accounts, etc.) for the resource transfer requests.

The database 135 may include records for a plurality of accounts and at least some of the records may define a quantity of resources associated with an entity. For example, the entity that is associated with the client device 110 may be associated with a resource account having one or more records in the database 135. The data records may reflect a quantity of stored resources that are associated with the entity. Such resources may include owned resources and, in at least some embodiments, borrowed resources (e.g., resources available on credit). The quantity of resources that are available to or associated with an entity may be reflected by a balance defined in an associated record such as, for example, a bank balance.

The database 135 may also store transfer configuration rules data comprising rules for handling resource transfer requests that are directed to the resource server 130. Various transfer configuration rules may be defined for specifying handling actions for automatically processing resource transfer requests to the resource server 130. For example, upon receiving a resource transfer request (e.g., from a client device 110, a transfer request issuing server, etc.), the resource server 130 may access the database 135 to identify transfer configuration rules that are relevant to the resource transfer request and determine one or more suitable handling actions based on the identified rules. Additionally, or alternatively, the transfer configuration rules data may be stored externally of the database 135.

In the example of FIG. 1, the resource server 130 may provide both resource transfer processing (e.g., electronic fund transfers) and data holding (e.g., banking) functions. In particular, the resource server 130 may be both a financial institution server and also a payment transaction processing server. The resource server 130 may, in some embodiments, be a proxy server, serving as an intermediary for requests for client devices 110 seeking resources from other servers. The resource server 130 may, for example, be a financial institution server and the entity associated with a client device 110 may be a customer of a financial institution operating the financial institution server.

As shown in FIG. 1, the system 100 may include a real-time transfer rail 140. In at least some embodiments, the real-time transfer rail 140 may be a payment rail. For example, the real-time transfer rail 140 may be hosted by a real-time payment system that includes a real-time payment server. The real-time payment system may be associated with a third-party and be configured to receive a resource (e.g., data) transfer request. The resource transfer request may include a request to transfer resources associated with a first data record to a second data record. The first data record may comprise a data record of a transferor and the second data record may comprise a data record of a recipient. For example, the first data record may be associated with a first financial institution database and the second data record may be associated with a second financial institution database.

The request to transfer resources may be a request to transfer data such as, for example, units of value. The units of value may include a quantity of currency. The transferor may initiate the resource transfer request using, for example, a computing device. The resource transfer request may be formatted as an ISO2022 message and may include one or more parameters. The ISO2022 format is a data-rich messaging format that provides the real-time transfer rail 140 with a clear and nuanced format of data. The one or more parameters may be included as metadata in the resource transfer request. The parameters may include, for example, resource definition data. The resource definition data defines what is requested to be transferred. By way of example, the resource definition data may define a resource that is stored in or otherwise associated with a data record associated with the transferor. The resource may represent units of value, such as a quantity of a currency.

Responsive to receiving a resource transfer request, the real-time payment system may complete the requested resource transfer using the real-time transfer rail 140. Specifically, the real-time payment server may be configured to receive the resource transfer request and to facilitate the resource transfer from the first data record associated with the transferor to the second data record associated with the recipient in real-time. In some embodiments, the resource transfer may be irrevocable; that is, the transferor may not be able to retrieve the transferred resources after completion of the transfer.

The real-time transfer rail 140 is configured to complete resource transfer requests in real-time or substantially in real-time. In at least some embodiments, real-time is defined as being within seconds. Certain factors, such as network traffic, may limit the immediacy of real-time transfers and/or processing of transfer requests.

The client device 110 may be used, for example, to configure a request to transfer resources of a resource account associated with the client device 110. More particularly, the client device 110 may be used to generate requests to transfer resources from a resource account (or data records associated therewith) of an entity operating the client device 110. A resource transfer may, for example, involve a transfer of data between a record in the database 135 associated with an account at the resource server 130 and another record in the database 135 (or in another database). The data involved in the resource transfer may, for example, be units of value and the records involved in the resource transfer may be adjusted in related or corresponding manners. For example, during a resource transfer, a record associated with the intended recipient (i.e., transferee) of the transfer may be adjusted to reflect an increase in value resulting from the transfer, whereas the record associated with the entity (i.e., transferor) initiating the transfer may be adjusted to reflect a decrease in value which is at least as large as the increase in value applied to the record associated with the transferee.

The system 100 includes at least one web server 150. The web server 150 is a computing system on which web-based services or applications run on. In particular, the web server 150 may host one or more web services (or service applications). The web server 150 accepts requests via a network protocol (e.g., Hypertext Transfer Protocol). For example, a client's user agent, such as a web browser, may request for a specific resource using HTTP and the web server 150 may respond by providing content associated with the requested resource or an error message to the client. The content may include pre-existing files that are available to the web server 150 (static content), or it can be generated by another program that communicates with the web server 150 (dynamic content). The web server 150 may also be configured to receive and store resources that are sent by clients. The web server 150 may comprise a single computer, an embedded system, or a collection of computers.

In at least some embodiments, the user information for end users of the web service(s) provided by the web server 150 may be stored in a data store, such as a database 155. The user information may include, for example, authentication credentials, account data, historical service usage data, and the like.

The system 100 also includes an authentication system 160. In at least some embodiments, the authentication system 160 may include at least one network server (i.e., an authentication system) that comprises one or more computers. The authentication system 160 is used for network access control. Specifically, the authentication system 160 provides a service of verifying credentials of entities (e.g., a person, computing device, etc.) that attempt to access certain applications or services. The authentication system 160 may be configured to handle authentication for a plurality of applications/services. In particular, the authentication system 160 may receive and process requests to authenticate users at one or more web services. When a client entity requests access to a resource (e.g., a web service), an authentication request in connection with the client's access may be transmitted to the authentication system 160. For example, a server hosting a web service may request the authentication system 160 to verify the requesting client's identity.

The authentication system 160 may implement one or more authentication protocols, depending on specific application and security requirements. Upon confirming the identity of a requesting client, the authentication system 160 may generate a response to the authentication request. The response may include, for example, an indication of an authentication status for a client. Generally, the authentication system 160 cooperates with at least one authorization server for providing appropriate permissions to an authenticated client. For example, when an end user of a web service is authenticated, the authentication system 160 may request an authorization server to release suitable access tokens to the authenticated user. In some embodiments, an authorization server may serve both authentication and authorization functions. That is, the authentication system 160 may comprise an authorization server.

While the authentication system 160 is illustrated in FIG. 1 as being external to the web server 150, it will be understood that the authentication system 160 may be integrated with the web server 150 in some embodiments. By way of example, the authentication system 160 may be implemented as a component, such as a software module (i.e., authentication module), of the web server 150. More generally, the functions of the authentication system 160 may be provided as part of authentication services that are implemented by the web server 150.

A messaging server 170 is also illustrated in FIG. 1. In at least some embodiments, the messaging server 170 may be an email server that handles and delivers email over a network. A mail server is configured to receive emails, store emails in a queue for delivery, and route emails to client computers or other mail servers. The messaging server 170 is a server that is associated with a messaging service, such as emails, SMS (Short Message Service), MMS (Multimedia Messaging Service), and the like. The messaging server 170 may be enabled to send or receive messages in the form of, for example, email, SMS and/or MMS transmissions between local and/or international telecommunications networks. The messages are eventually routed to messaging service-enabled devices for access by clients.

The client device 110, the resource server 130, the third-party web server 150, the authentication system 160 and the messaging server 170 may be in geographically disparate locations. Put differently, the client device 110 may be remote from the resource server 130, the third-party web server 150, the authentication system 160 and/or the messaging server 170. As explained herein, the client device 110, the resource server 130, the third-party web server 150, the authentication system 160 and the messaging server 170 are computing systems.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

Figure 2A:
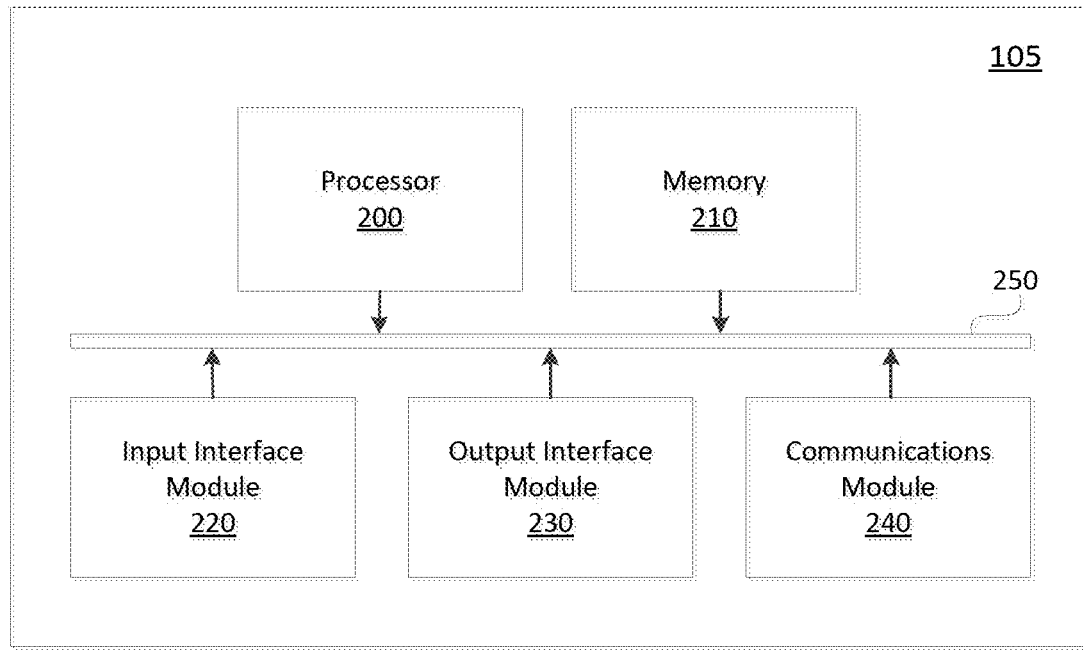
FIG. 2A is high-level schematic diagram of a computing device.

FIG. 2A is a high-level operation diagram of an example computing device 105. In at least some embodiments, the example computing device 105 may be exemplary of one or more of the resource servers 130 and 140 and the client device 110. The example computing device 105 includes a variety of modules. For example, the example computing device 105, may include a processor 200, a memory 210, an input interface module 220, an output interface module 230, and a communications module 240. As illustrated, the foregoing example modules of the example computing device 105 are in communication over a bus 250.

The processor 200 is a hardware processor. Processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 105.

The input interface module 220 allows the example computing device 105 to receive input signals. Input signals may, for example, correspond to input received from a user. The input interface module 220 may serve to interconnect the example computing device 105 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned example input devices.

The output interface module 230 allows the example computing device 105 to provide output signals. Some output signals may, for example allow provision of output to a user. The output interface module 230 may serve to interconnect the example computing device 105 with one or more output devices. Output signals may be sent to output devices by output interface module 230. Output devices may include, for example, a display screen such as, for example, a liquid crystal display (LCD), a touchscreen display. Additionally, or alternatively, output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the example computing device 105 to communicate with other electronic devices and/or various communications networks. For example, the communications module 240 may allow the example computing device 105 to send or receive communications signals. Communications signals may be sent or received according to one or more protocols or according to one or more standards. For example, the communications module 240 may allow the example computing device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 240 may allow the example computing device 105 to communicate using near-field communication (NFC), via Wi-Fi™, using Bluetooth™ or via some combination of one or more networks or protocols. Contactless payments may be made using NFC. In some embodiments, all or a portion of the communications module 240 may be integrated into a component of the example computing device 105. For example, the communications module may be integrated into a communications chipset.

Software comprising instructions is executed by the processor 200 from a computer-readable medium. For example, software may be loaded into random-access memory from persistent storage of memory 210. Additionally, or alternatively, instructions may be executed by the processor 200 directly from read-only memory of memory 210.

Figure 2B:
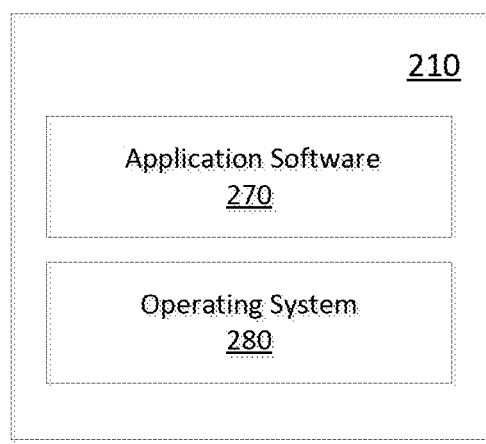
FIG. 2B shows a simplified organization of software components stored in a memory of the computing device of FIG. 2A.

FIG. 2B depicts a simplified organization of software components stored in memory 210 of the example computing device 105. As illustrated, these software components include application software 270 and an operating system 280.

The application software 270 adapts the example computing device 105, in combination with the operating system 280, to operate as a device performing a particular function. In some embodiments, the application software 270 may comprise a resource management application. The resource management application may, for example, be a personal banking application that is used to manage one or more bank accounts. The resource management application may provide various functions such as resource transfers (e.g., electronic fund transfers, etc.), display of account balances, and other account management functions. For example, the resource management application may enable users to configure requests for transfers of resources to accounts associated with the users. In particular, the resource management application may be used to generate resource transfer requests. A user may input information, or parameters, for defining a resource transfer request, such as the identity of the transferor, quantum of resources requested, and account information for a designated account for receiving the transfer. Once it is defined, the resource transfer request can be transmitted, via the resource management application, to a computing system for processing resource transfers. For example, the resource transfer request may be transmitted to a resource server managing the account(s) of the requesting entity, and the resource server may subsequently direct the request to a suitable computing system (e.g., resource management server) that is associated with the identified transferor for the resource transfer.

The operating system 280 is software. The operating system 280 allows the application software 270 to access the processor 200, the memory 210, the input interface module 220, the output interface module 230 and the communications module 240. The operating system 280 may be, for example, Apple iOS™, Google™ Android™, Linux™, Microsoft™ Windows™, or the like.

Figure 3:
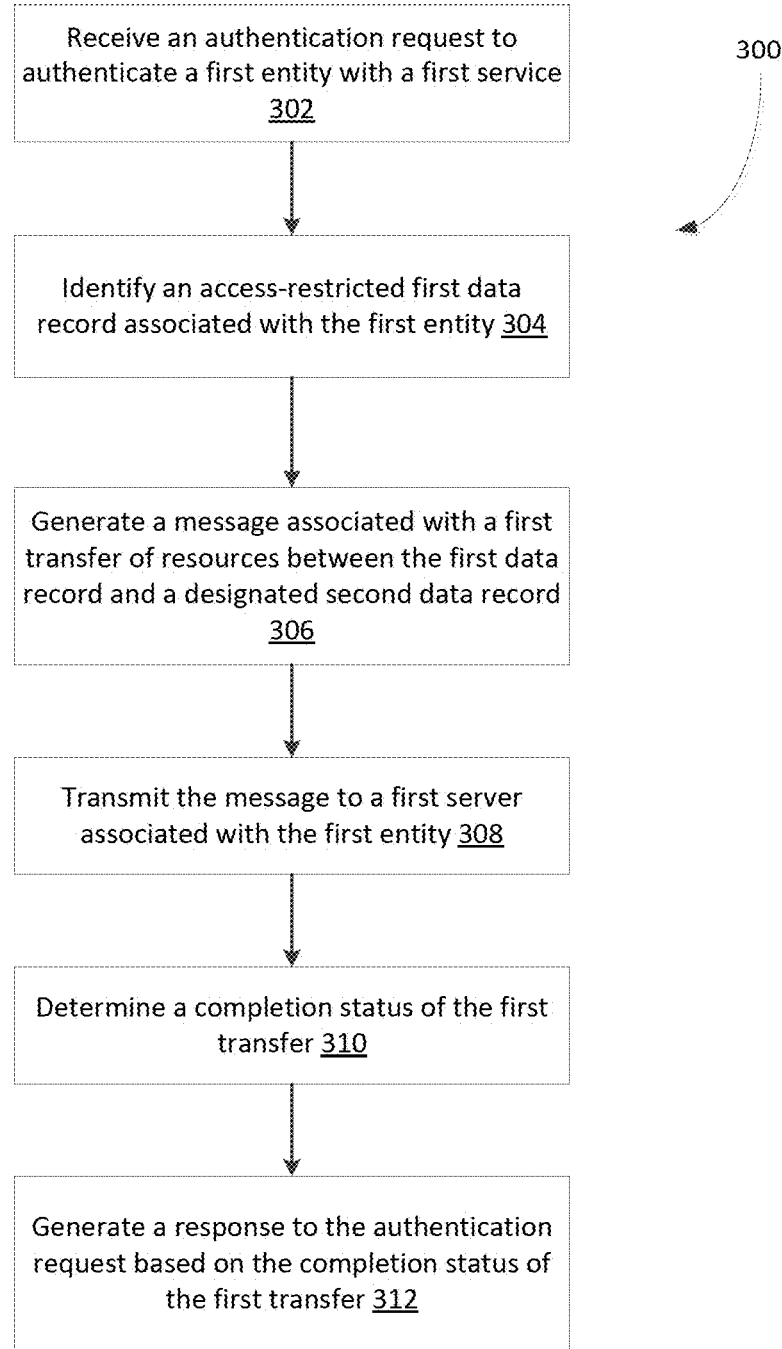
FIG. 3 shows, in flowchart form, an example method for authenticating end users of a web service.

Reference is now made to FIG. 3, which shows, in flowchart form, an example method 300 for authenticating end users of a web service. The method 300 may be implemented by an access management system, such as the authentication system 160 of FIG. 1. In particular, a computing system that is configured to control access to web resources (e.g., web services) may implement the method

300. As a specific example, the operations of method 300 may be performed by an authentication system 160 when processing user requests to access a web service. Operations starting with operation 302 and continuing onward may be performed, for example, by the processor 200 (FIG. 2A) of a computing device 105 executing software comprising instructions such as may be stored in the memory 210 of the computing device 105. Specifically, processor-executable instructions may, when executed, configure a processor 200 of an authentication system 160 to perform all or parts of the method 300.

In operation 302, an authentication system receives a request to authenticate an end user with a first service. The first service may, for example, be a web-based service. In at least some embodiments, the authentication request may be received from a server that provides (e.g., hosts) the first service. Specifically, when a client entity, such as an end user, attempts to access the first service, a web server associated with the first service may generate and forward an authentication request to the authentication system. For example, if an attempt by an end user to log in to their user account at a web service is detected, the web server may request for the end user to be authenticated by the authentication system. As another example, upon detecting a transaction on a payment processing service (e.g., PayPal), a web server associated with the service may request authentication of at least one of the transacting entities (e.g., the payment recipient).

In some embodiments, the authentication request may originate from a device of an end user requesting to access the first service. That is, an authentication request may be generated by a client device and transmitted to the authentication system. For example, when an end user attempts to access their user account at a web service, a client device associated with the end user may generate a request for authenticating the end user with the web service, and the authentication request may be forwarded by the client device to the authentication system.

Each authorized end user of the first service may be associated with a respective user account at the first service. That is, an end user that is authorized to access the first service may have their own user account. For example, when an end user signs up with the first service, a user account for the end user may be created. The end user may only be authorized to access their own user account at the first service. In particular, an end user may gain access to their user account, and only their account, by authenticating to the first service using their authentication credentials.

Account data for a user account may define the various privileges of the end user in connection with use of the first service. The account data may include identifying information for the end user. For example, the account data may include messaging (e.g., email, SMS, etc.) addresses, bank account information, and the like. The identifying information for the end user may be tied to one or more external accounts that are associated with the user. In particular, the end user's external accounts, or accounts that are external to the first service, may be linked to the user account at the first service.

Upon receiving the authentication request, the authentication system identifies a first data record associated with the end user, in operation 304. The first data record is a data record that requires user authentication for access. In particular, the first data record may only be accessed upon successful authentication (e.g., using login credentials) to a database storing the first data record. In at least some embodiments, the first data record may be associated with an external account of the end user. The external account may be an account that is linked to the user account of the end user at the first service. For example, the first data record may be associated with an external account, such as a resource account (e.g., bank account), email account, SMS account, and the like, that is represented in the account data for the end user's account at the first service.

The authentication system leverages information about the external account(s) that are linked to the user account at the first service in performing authentication of the end user. Specifically, the authentication system causes a transfer of resources to be initiated in connection with the first data record such that authenticating to at least one of the external accounts of the end user is required for successful completion of the resource transfer. The completion of the resource transfer serves as a proxy for authentication of the end user at the first service. In particular, the authentication system may determine that an end user requesting access to the first service is authenticated when the resource transfer tied to at least one of the user's external accounts is successfully completed.

In operation 306, the authentication system generates a message ("resource transfer message") associated with a transfer of resources between the first data record (i.e., a data record associated with an external account of the end user) and a second data record. The resource transfer message is intended to cause a resource transfer to be initiated in connection with the first data record. The resource transfer message identifies one of the first and second data records as a recipient data record for the resource transfer. For example, the resource transfer may designate the first data record as the recipient data record such that resources are caused to be transferred from the second data record to the first data record. As another example, the resource transfer may designate the second data record as the recipient data record and resources may be requested to be transferred from the first data record to the second data record. The resource transfer message also defines a quantity of resources to be transferred by the resource transfer. For example, the resource transfer message may specify a number of units of resources to transfer to or from the first data record.

The authentication system uses resource transfers that engage an end user's external accounts in order to authenticate the end user with the first service. The resource transfer message generated in operation 306 defines the parameters of such resource transfers ("authentication resource transfers"). The resource transfer message can take different forms, and the processing of the resource transfer message during end user authentication depends on the message form. Examples of message forms and corresponding methods for processing the resource transfer message are described in greater detail below with reference to FIGS. 4, 5 and 8.

The resource transfer message is transmitted to a server associated with the end user, in operation 308. After generating the resource transfer message, the authentication system identifies a suitable server that is configured for processing the message. In some embodiments, the server may be a computer server providing one or more messaging services, such as the messaging server 170 of FIG. 1. For example, if the resource transfer message is an electronic message that contains details of an authentication resource transfer, the authentication system may forward the message to a server associated with a messaging (e.g., email, SMS, etc.) account of the end user. In some embodiments, the server may be a resource management server that manages the external account associated with the first data record. For example, the authentication resource transfer message may comprise a request to transfer a payment to a recipient bank account, and the authentication system may forward the message to a resource server, such as a financial institution server, that manages a resource (e.g., banking) account of the end user.

The server identified as part of operation 308 is one that requires authentication. In particular, authentication to the server is required in order to access the resource transfer message. In this way, access to the resource transfer message is limited to authorized entities, i.e., the entities having access to the external accounts linked to the user account at the first service. By restricting access to the message for initiating an authentication resource transfer that engages an external account of the end user and by requiring that the authentication resource transfer be completed in order for the end user to be authenticated to the first service, the authentication system effectively implements a multi-factor authentication of the end user that requests access to the first service.

In operation 310, the authentication system determines a completion status of the authentication resource transfer. In at least some embodiments, an indication of the transfer completion status may be communicated to the authentication system by the server (identified in operation 308) which handles the resource transfer message. The authentication system may detect either a transfer success or transfer failure of the authentication resource transfer based on the indication of the transfer completion status. For example, the indication of the transfer completion status may be in the form of a notification message (i.e., a response message) from a messaging server associated with a messaging service. The notification message may indicate an authentication success or failure of the end user at the messaging server. As another example, the indication of the transfer completion status may be in the form of a notification message from a resource server that manages the first data record. The notification message may indicate an authentication success or failure of the end user at the resource server.

The authentication system may determine the transfer completion status of an authentication resource transfer based on defined criteria and/or rules. In some embodiments, certain criteria/rules relating to the resource transfer message may be used for determining whether the authentication resource transfer is successfully completed. For example, a time-out condition may be associated with the resource transfer message such that if the authentication resource transfer is not completed within a defined period of time from when the resource transfer message is sent to the server, the resource transfer may be determined to have failed. That is, an end user may only have a limited amount of time to ensure that the authentication resource transfer is completed when attempting to authenticate to the first service.

In operation 312, the authentication system generates a response to the authentication request based on the transfer completion status of the authentication resource transfer. In particular, the authentication system determines whether the requesting end user is authenticated to the first service and an authentication response is generated based on said determination. For example, if the authentication resource transfer is determined to have been successfully completed, the requesting end user may be authenticated for accessing the first service.

Figure 4:
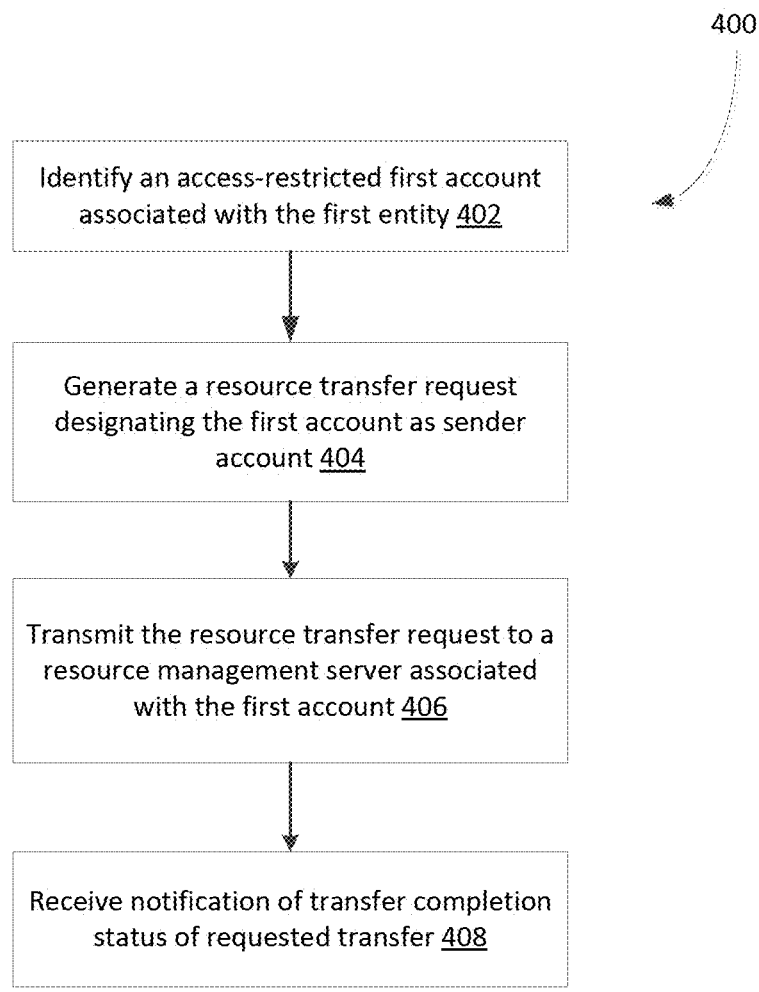
FIG. 4 shows, in flowchart form, an example method for exchanging resource transfer messages for end user authentication at a web service.

Reference is now made to FIG. 4 which shows, in flowchart form, an example method 400 of processing resource transfers for end user authentication at a web service. Specifically, FIG. 4 illustrates a method for generating an authentication resource transfer that engages an external account of an end user when authenticating the end user to a web service. The method 400 may be implemented by an access management system, such as the authentication system 160 of FIG. 1. In particular, an authentication system 160 may perform the method 400 as part of a process for authenticating end users. The operations of method 400 may be performed in addition to, or as alternatives of, one or more of the operations of method 300.

In operation 402, an authentication system identifies an access-restricted account associated with an end user requesting to access a web service. In particular, the authentication system identifies an external account of the end user that is linked to the user's account at the web service. The external account may, for example, be a bank account, a messaging account, etc. associated with the end user that is external to and independent of the end user's account at the web service. In at least some embodiments, the external account may be identified based on account data for the user's account. The account data may include identifying information, such as messaging addresses, personal account numbers, and the like, for one or more linked external accounts. The identifying information may be provided by the end user, for example, at the time of registering for the web service. The authentication system may select an external account based on the identifying information associated with the external account.

Once an external account of the end user has been selected, the authentication system generates a resource transfer request that designates the external account as a sender account, in operation 404. Specifically, a request for an authentication resource transfer is generated by the authentication system. The authentication resource transfer may, for example, be a request for payment of a defined amount from the end user's bank account to a designated recipient account. The request for payment may specify an amount that is requested to be sent to the recipient account. For example, the request for payment may be a request for a nominal or zero value transfer.

A resource transfer request may be a specially formatted message that is sent to a resource management system. In particular, the resource transfer request may be sent to a resource management system associated with a sender/transferor. The resource transfer request may be sent via a transfer rail that is used for facilitating transfers between data records associated with different resource management systems. The resource management system may be associated with a database storing account data for one or more resource accounts. Each record in the database may be associated with a particular one of these resource accounts.

A resource transfer request is a message that is sent (usually on behalf of a recipient) to cause a transfer of resources to be initiated from a sender (i.e., a transferor entity) to the recipient. In particular, the resource transfer request may be sent to a resource management system associated with the sender. The resource transfer request is a request to transfer from a record/account in a database that is associated with the sender to a record/account in a database that is associated with a recipient. The resource transfer request includes one or more identifiers that identify the record associated with the sender and/or the record associated with the recipient. For example, the identifier(s) may be or include an account number. The resource transfer request may also include one or more identifiers that identify the resource management system associated with the sender and/or that identify the resource management system associated with the recipient. Such identifiers may be or include one or more of a transit number and an institution number.

The resource transfer request of operation 404 may specify a recipient data record and/or account. The recipient account may, for example, be a resource account that is configured for receiving transfers of resources. A resource management system associated with the recipient account may be communicably coupled to the authentication system. In particular, the resource management system may be configured to communicate whether a requested transfer of resources to the recipient account has been successfully completed, or whether it has failed.

The resource transfer request comprises a transfer initiation message. That is, the resource transfer request is an initial message that may be used to cause a transfer of resources to occur. Since the resource transfer request is initiated by or on behalf of a recipient, the resource transfer request may be considered a pull-style transfer, to be contrasted with typical push-style transfers. In at least some implementations, the resource transfer request may be formatted as an ISO20022 message.

The resource transfer request message is specially formatted to include parameters of a transfer that is requested to be made from a sender. The parameters may be included as metadata in the resource transfer request message. Where the request to transfer is an ISO20022 message, the parameters may be included in an ISO20022 format. The parameters may include resource definition data. The resource definition data defines what is requested to be transferred. By way of example, the resource definition data may define a resource that is stored in or otherwise associated with a record associated with the sender. The resource may be, for example, a computing resource. In another implementation, the resource may be electronic data. In some implementations, the resource may represent units of value, such as a quantity of a currency.

The parameters that are included in the resource transfer request may include data of another type. For example, in some implementations, the parameters may be or include transfer scheduling data. The transfer scheduling data may represent a time when the requested transfer is to be made. This time may be, for example, a due date or deadline for the transfer. The due date or deadline may represent a latest time at which the transfer is to be made.

The resource transfer request message may, in some implementations, be or represent a request for payment. Such a message may be referred to as a request-for-payment (RFP) message or a request-to-pay (RTP) message. In such implementations, the transfer rail may be a payment rail such as a real-time payment rail, and the resource management system may be a financial institution system. The data records may, for example, represent bank accounts and the requested transfer may be a transfer of value from an identified sender bank account to a recipient bank account.

The resource transfer request message may be a special transfer message which is not formatted as an email or short message service (SMS) message. Instead, it may be a computer-to-computer message that is formatted to be specially processed by the resource management system that receives it. In at least some implementations, the computer-to-computer message may be formatted according to the ISO20022 standard. For example, the resource management system that receives the resource transfer request message may be configured to execute a process for obtaining authorization to complete a transfer in response to receiving the resource transfer request. More particularly, the resource management systems may be configured to only permit authorized transfers. For example, in one implementation, the database may store account data for a plurality of accounts and the associated resource management system may only allow a transfer from an account if the transfer is authorized by an authorization entity for that account, such as an account holder. Authorization may, for example, require authenticated approval using credentials such as one or more of: a username, password, biometric authentication data or other credential.

In one implementation, in response to receiving the resource transfer request message, a resource management system may identify an affected account using an identifier defined by the resource transfer request message. The resource management system may subsequently send an electronic notification to a client device associated with the identified account. The notification may be provided as an in-application notification or operating system level notification. The notification may, for example, include a selectable option to authorize the transfer. The notification may allow the transfer to be made without requiring input of parameters that are typically required when a transfer is initiated by the sender rather than the recipient. By way of example, one or more parameters that are included in the resource transfer request may be used to pre-stage or pre-populate parameters of the transfer so that the sender does not have to manually input such parameters. In some implementations, the resource definition data included in the resource transfer request may be used to allow the transfer to be made without having the sender define what is to be transferred. For example, where the transfer is a transfer of a computing resource or electronic data, the sender may perform, or cause to be performed, the transfer without having to input any information defining the computing resource or data involved. Additionally, or alternatively, where the transfer is a transfer of units of value, the amount of value defined in the resource transfer request message may be used so that the sender does not have to define the value requested to be transferred.

In some implementations, transfer scheduling data included in the resource transfer request message may be used to schedule the transfer without requiring the sender to define such a schedule. For example, where the transfer scheduling data includes indication of a due date or deadline, the resource management system associated with the sender may automatically define a time for a transfer based on the transfer scheduling data without requiring the sender to manually input such time information.

The requested transfer of resources is for authenticating the end user at the web service. Specifically, the authentication resource transfer engages an external account (e.g., resource account) of the end user, as resources are requested to be transferred from the external account (or a data record associated therewith) to a designated recipient account. The authentication resource transfer may only be completed if the end user successfully authenticates to the external account. Accordingly, completion of the authentication resource transfer serves as a proxy for the end user being authenticated to the external account. In turn, such authentication to the external account verifies the end user's ownership of the external account, and the authentication system relies on the verification of account ownership in performing authentication of the end user for the web service.

In operation 406, the authentication system transmits the resource transfer request to a resource management server associated with the external account. The resource transfer request may, for example, be a request for payment that is sent to a server, such as a financial institution server, associated with the end user's bank account. In at least some embodiments, the request for payment may be sent to the server via a real-time payment rail. In particular, the authentication system may transmit a request for payment to a financial institution server that is associated with (i.e., manages) the end user's bank account using a real-time payment rail. The resource transfer request may comprise a message including instructions for the server to handle a transfer of resources from the end user's external account in accordance with the parameters of the resource transfer request.

The authentication system subsequently receives a notification (and more generally, a response message to the resource transfer request) indicating a transfer completion status of the authentication resource transfer, in operation 408. The notification may be provided, for example, by a resource management server associated with the recipient account for the authentication resource transfer. The notification may indicate either a transfer success or transfer failure for the authentication resource transfer. For example, if the authentication resource transfer is a payment transfer, a financial institution server associated with the recipient account for the payment may indicate whether the requested payment is received. The authentication system may determine whether the end user is authenticated for the web service based on the transfer completion status of the authentication resource transfer.

In at least some embodiments, the authentication system may validate the response message associated with the resource transfer request. In particular, the authentication system may verify that the response message is associated with the end user requesting access to the web service. For example, if the response message indicates that the authentication resource transfer was successfully completed, the authentication system may match the transfer data of the authentication resource transfer to information of an end user attempting to authenticate to the web service. That is, a check is performed to verify that completed resource transfer is associated with the end user that is being authenticated. The message data (e.g., metadata) of the response message may indicate information, such as name, account number, or other data, associated with a sender of the authentication resource transfer. The information in the message data may be compared to account data of the end user at the web service to determine whether there is a match. Additionally, or alternatively, the authentication system may verify that the response message designates a correct quantity of resources to be transferred by the authentication resource transfer.

Figure 5:
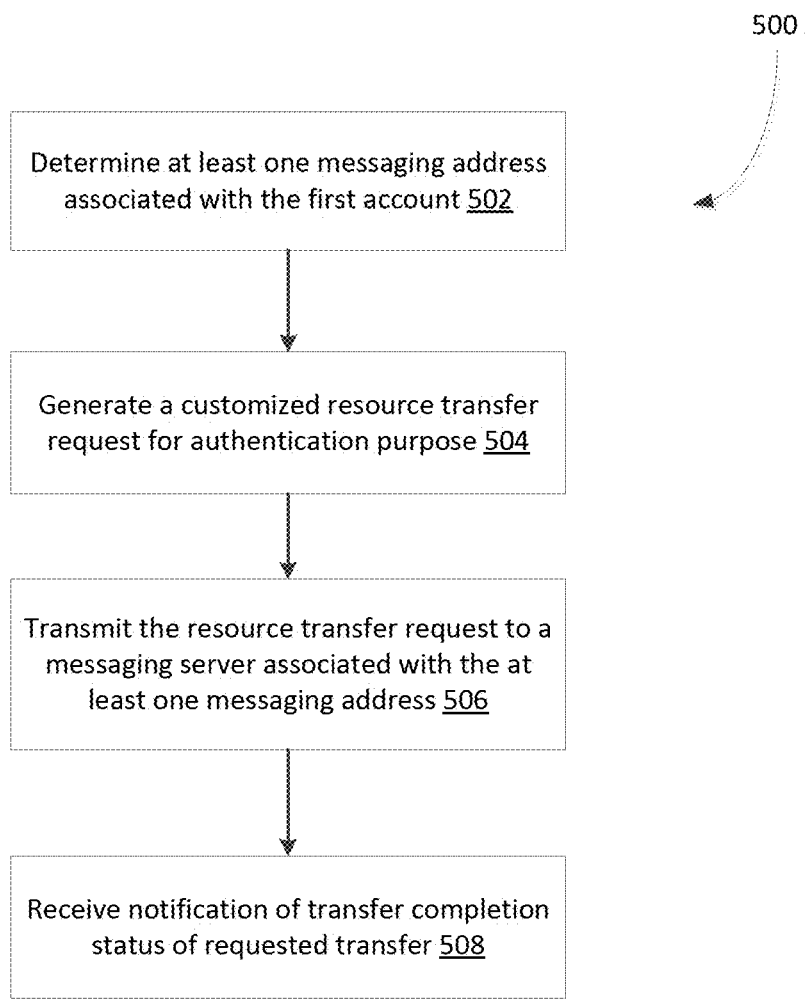
FIG. 5 shows, in flowchart form, another example method for exchanging resource transfer messages for end user authentication at a web service.

Reference is now made to FIG. 5 which shows, in flowchart form, another example method 500 of processing resource transfers for end user authentication at a web service. Specifically, FIG. 5 illustrates a method for generating an authentication resource transfer that engages an external account of an end user when authenticating the end user to a web service. The method 500 may be implemented by an access management system, such as the authentication system 160 of FIG. 1. In particular, an authentication system 160 may perform the method 500 as part of a process for authenticating end users. The operations of method 500 may be performed in addition to, or as alternatives of, one or more of the operations of methods 300 and 400.

In operation 502, an authentication system determines at least one messaging address associated with an external account of the end user. The external account may be a messaging (e.g., email, SMS, etc.) account that is linked to the end user's account at the web service. The account data for the user's account at the web service may including identifying information for one or more messaging accounts of the end user, and the at least one messaging address may be associated with one of such messaging accounts.

The authentication system generates a customized resource transfer request, in operation 504. In particular, a resource transfer request that is formatted for sending to the at least one messaging address is generated by the authentication system. The requested transfer of resources is for authenticating the end user at the web service, i.e., it is an authentication resource transfer. Specifically, the authentication resource transfer causes resources to be transferred from a resource (e.g., bank) account of the end user to a designated recipient account. The authentication resource transfer may only be completed if the end user successfully authenticates to the messaging account and the resource account.

In some embodiments, the resource transfer request may comprise an email message that is formatted for sending to an email address associated with the end user. The message content of the email message may include at least one user interface element which may be selected to initiate an authentication resource transfer, such as a payment transfer. For example, the email message may include a link which, when selected, directs the end user to a user interface of an application for initiating the requested resource transfer. The application may, for example, be a mobile banking application that is executable on the user's device or a web browser. The end user may navigate to a page of the application that allows for initiating the requested resource transfer.

In operation 506, the authentication system transmits the generated resource transfer request to a messaging server associated with the at least one messaging address. In particular, the resource transfer request is made available in the at least one messaging account of the end user. In order for an end user to authenticate to the web service, the end user is required to first authenticate to the messaging server (i.e., the user's messaging account) to access the resource transfer request and additionally authenticate to their resource (e.g., bank) account to initiate the requested resource transfer. That is, at least two levels of authentication may be imposed on the requesting end user before access to the web service is granted—a first authentication to a messaging account linked to their user account at the web service and a second authentication to their resource account. In this way, the authentication system effectively implements a multi-factor authentication of the requesting end user.

The authentication system subsequently receives a notification (and more generally, a response message to the resource transfer request) indicating a transfer completion status of the authentication resource transfer, in operation 508. The notification may be provided, for example, by a resource management server associated with the recipient account for the authentication resource transfer. The notification may indicate either a transfer success or transfer failure for the authentication resource transfer. For example, if the authentication resource transfer is a payment transfer, a financial institution server associated with the recipient account for the payment may indicate whether the requested payment is received. The authentication system may determine whether the end user is authenticated for the web service based on the transfer completion status of the authentication resource transfer.

In at least some embodiments, the authentication system may validate the response message associated with the resource transfer request. In particular, the authentication system may verify that the response message is associated with the end user requesting access to the web service. For example, if the response message indicates that the authentication resource transfer was successfully completed, the authentication system may match the transfer data of the authentication resource transfer to information of an end user attempting to authenticate to the web service. That is, a check is performed to verify that completed resource transfer is associated with the end user that is being authenticated. The message data (e.g., metadata) of the response message may indicate information, such as name, account number, or other data, associated with a sender of the authentication resource transfer. The information in the message data may be compared to account data of the end user at the web service to determine whether there is a match. Additionally, or alternatively, the authentication system may verify that the response message designates a correct quantity of resources to be transferred by the authentication resource transfer.

Figure 6:
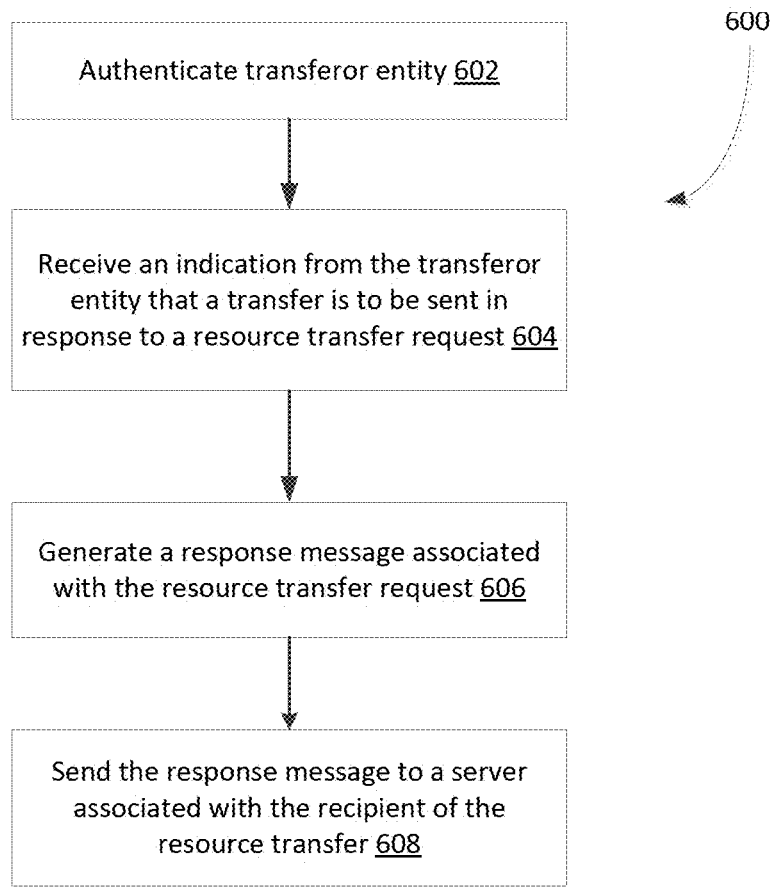
FIG. 6 shows, in flowchart form, an example method for generating a response to a resource transfer request.

Reference is now made to FIG. 6, which shows, in flowchart form, an example method 600 for generating responses to a resource transfer request. The method 600 may be performed by a resource management system, such as the resource server 130 of FIG. 1. In particular, a computing system that is configured to manage resources associated with one or more resource accounts may implement the method 600. A resource management system may perform the method 600 in cooperating with an authentication system for authenticating an end user at a web service. Operations starting with operation 602 and continuing onward may be performed, for example, by the processor 200 (FIG. 2A) of a computing device 105 executing software comprising instructions such as may be stored in the memory 210 of the computing device 105. In particular, processor-executable instructions may, when executed, configure a processor 200 of the resource server 130 to perform all or parts of the method 600.

As described above, a request for an authentication resource transfer may be transmitted to a resource management system, such as a financial institution server, associated with an external (e.g., resource) account of an end user requesting access to a web service. For example, a request for payment may be sent to a financial institution server managing a bank account of the end user attempting to authenticate to the web service. The end user may authenticate to the financial institution server in order to access the request for payment and then to initiate the requested payment from their bank account.

In operation 602, the resource management system authenticates the end user (i.e., the transferor entity) associated with an authentication resource transfer. The end user may input authentication credentials, including account number, password (e.g., a passcode, biometric data, etc.) in order to authenticate to the resource management system.

Once the end user is authenticated, the resource management system receives, from the end user, input indicating that a transfer is to be sent in response to a resource transfer request, in operation 604. That is, the end user provides input for responding to the resource transfer request. In particular, the input may comprise a request to initiate the requested transfer of resources from the end user's resource account. For example, the end user may input a selection of a link (or other user interface element) to initiate a transfer in the amount requested in the resource transfer request. The transfer may, for example, be a payment transfer for a nominal or zero amount to a designated recipient.

The authentication resource transfer may then be initiated by the resource management system. In particular, the resource management system generates a response message associated with the resource transfer request, in operation 606. The response message may, for example, be a payment message in response to the resource transfer request. That is, a payment message associated with a payment transfer by the end user (i.e., from the end user's bank account) may be generated. In operation 608, the resource management system sends the response message to a server associated with the recipient of the authentication resource transfer. The server may be a recipient resource management system. Specifically, the response message may be transmitted to a server that manages a data record (and/or account) of a recipient of the authentication resource transfer.

Figure 7:
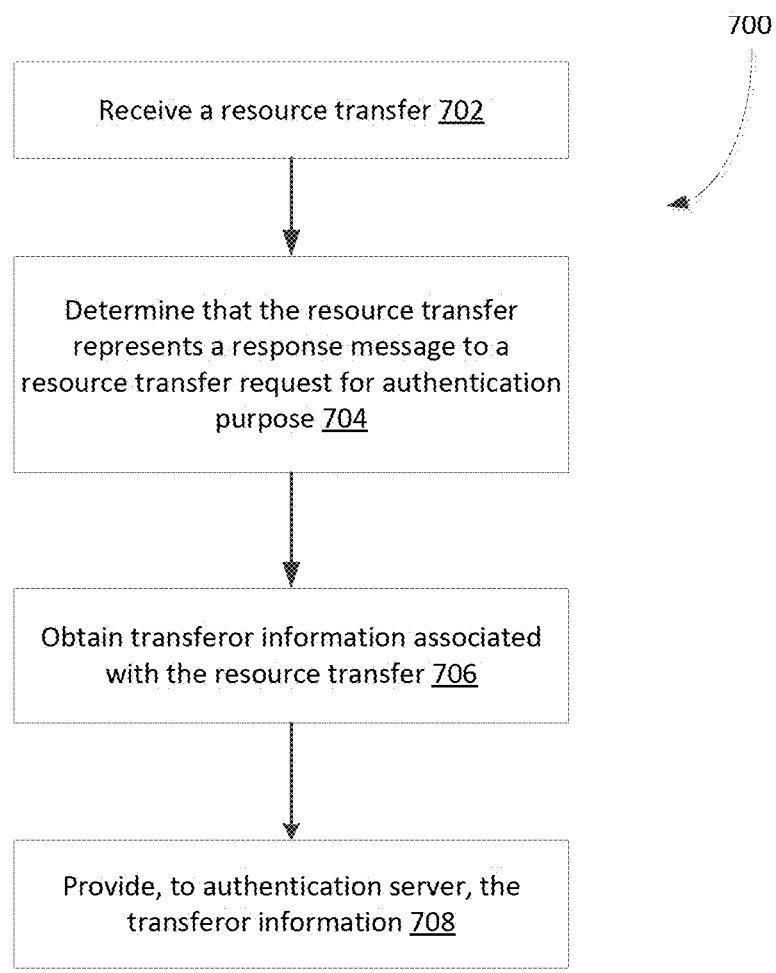
FIG. 7 shows, in flowchart form, an example method for processing a response to a resource transfer request.

Reference is now made to FIG. 7, which shows, in flowchart form, an example method 700 for processing responses to a resource transfer request. The method 700 may be performed by a resource management system, such as the resource server 130 of FIG. 1. In particular, a computing system that is configured to manage resources associated with one or more resource accounts may implement the method 700. A resource management system may perform the method 700 in cooperating with an authentication system for authenticating an end user at a web service. Operations starting with operation 702 and continuing onward may be performed, for example, by the processor 200 (FIG. 2A) of a computing device 105 executing software comprising instructions such as may be stored in the memory 210 of the computing device 105. In particular, processor-executable instructions may, when executed, configure a processor 200 of the resource server 130 to perform all or parts of the method 700.

As described above, an authentication resource transfer may be initiated by an end user requesting access to a web service. In particular, a transfer of resources from a resource account of the end user may be initiated. The authentication resource transfer may be received by a resource management system associated with the recipient, in operation 702. For example, a payment message for responding to a resource transfer request may be received by the resource management system for the recipient account. More generally, a message for initiating an authentication resource transfer from an end user of a web service is received by the recipient resource management system.

In operation 704, the resource management system determines that the received resource transfer represents a response message to an authentication resource transfer request. In particular, the resource management system may determine that the resource transfer is for authenticating an end user (i.e., the transferor that initiated the resource transfer) for access to a web service.

The resource management system may obtain transferor information associated with the resource transfer, in operation 706. That is, the resource management system may obtain information identifying the transferor of the received resource transfer. The information may, for example, be obtained based on message data of the resource transfer message associated with the authentication resource transfer. For example, the resource management system may extract certain data fields from the resource transfer message containing transferor information. The transferor information may be used by, for example, an authentication system to determine whether there is a match between the resource transferring entity and an end user attempting to gain access to the web service. In operation 708, the resource management system provides, to an authentication system, the obtained transferor information.

Figure 8:
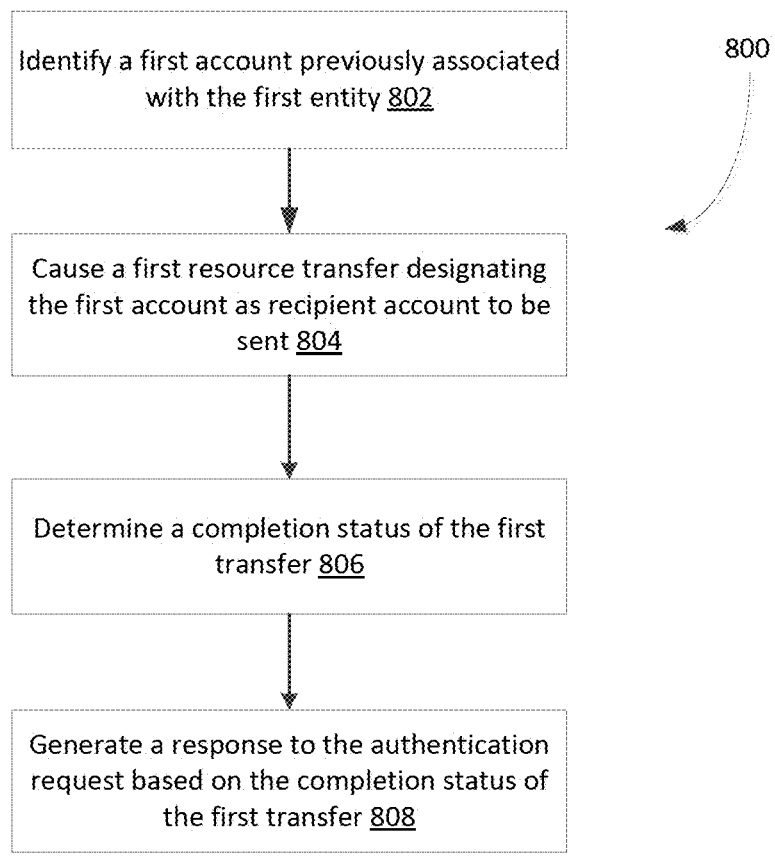
FIG. 8 shows, in flowchart form, another example method for authenticating end users of a web service.

Reference is now made to FIG. 8 which shows, in flowchart form, another example method 800 of authenticating end users of a web service. Specifically, FIG. 8 illustrates a method for processing an authentication resource transfer that engages an external account of an end user when authenticating the end user to a web service. The method 800 may be implemented by an access management system, such as the authentication system 160 of FIG. 1. In particular, an authentication system 160 may perform the method 800 as part of a process for authenticating end users. The operations of method 800 may be performed in addition to, or as alternatives of, one or more of the operations of methods 300 to 700.

An authentication system receives a request to authenticate an end user to a web service. In operation 802, the authentication system identifies an external account that is associated with the end user. The external account may be, for example, a resource (e.g., bank) account, a messaging account, and the like, that is owned by the end user. Account data for the user account of the end user at the web service may include identifying information for one or more external accounts that are linked to the user account. For example, the account data may include messaging addresses, account numbers, etc. that identify specific external accounts of the end user.

In operation 804, the authentication system causes an authentication resource transfer to be sent. In particular, the authentication resource transfer designates the end user's resource account as the recipient account. The authentication resource transfer may, for example, be a payment transfer. For example, a bank account of the end user that is linked to the user's account at the web service may be designated as the recipient account for a payment transfer. In order for the end user to be authenticated to the web service, the authentication resource transfer is required to be completed. That is, completion of the authentication resource transfer is a precondition to authenticating the end user for the web service. As the end user's resource account is designated as the recipient account, the authentication resource transfer can only be successfully completed if the transfer is received at said resource account.

In some embodiments, the authentication system may send a payment message to a messaging address associated with the end user. The payment message may be accessed only upon successful authentication to the messaging account. That is, the end user may access the payment message to complete the associated authentication resource transfer only if the user successfully authenticates to the messaging account. The payment may be deposited to a bank account that is previously configured for use with the messaging account of the end user. In particular, an end user is required to authenticate to both the messaging account and the bank account (i.e., account that is designated as the recipient account) in order to complete the authentication resource transfer. In this way, even if an unauthorized entity receives the payment message, they are unable to complete the transfer since the payment is tied exclusively to the bank account associated with the end user.

In operation 806, the authentication system determines a completion status of the authentication resource transfer. Specifically, the authentication system determines whether the authentication resource transfer has been successfully completed or whether it has failed. The authentication system generates a response to the authentication request based on the completion status of the authentication resource transfer, in operation 808.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computing system, comprising:
   a processor;
   a communications module coupled to the processor; and
   a memory coupled to the processor, the memory storing instructions that, when executed, configure the processor to:
   receive an authentication request to authenticate a first entity with a first service;
   in response to receiving the authentication request:
   identify an access-restricted first data record associated with the first entity;
   generate a message associated with a first transfer of resources between the first data record and a designated second data record, the message identifying one of the first and second data records as a recipient data record for the first transfer and defining a first quantity of resources to transfer; and
   transmit the message to a first server associated with the first entity, the first server requiring user authentication to access the message;
   determine a completion status of the first transfer; and
   generate a response to the authentication request based on the completion status of the first transfer.

2. The computing system of claim 1, wherein the first server comprises a messaging server associated with a messaging service that is independent of the first data record.

3. The computing system of claim 1, wherein the first server comprises a resource server associated with the first data record and wherein the first transfer comprises a transfer of resources via a real-time transfer rail.

4. The computing system of claim 1, wherein the message comprises a resource transfer request to cause the first transfer of resources to be initiated from the first data record to the second data record and wherein determining the completion status of the first transfer comprises:
   receiving a response message associated with the resource transfer request; and
   validating the response message.

5. The computing system of claim 4, wherein validating the response message comprises:
   verifying that the response message is associated with the first entity; and determining that the response message designates the first quantity of resources to be transferred to the second data record.

6. The computing system of claim 1, wherein determining the completion status of the first transfer comprises detecting transfer failure of the first transfer and wherein the response to the authentication request comprises a notification of the transfer failure.

7. The computing system of claim 6, wherein the transfer failure of the first transfer comprises at least one of:
an authentication failure of the entity at a messaging server associated with a messaging service; or
an authentication failure of the entity at a resource server associated with the first data record.

8. The computing system of claim 6, wherein detecting the transfer failure of the first transfer comprises determining that a time-out condition associated with the first transfer has occurred.

9. The computing system of claim 1, wherein the message comprises a transfer initiation message for transferring the first quantity of resources from the second data record to the first data record and wherein determining the completion status of the first transfer comprises determining that the first quantity of resources is received at the first data record.

10. The computing system of claim 9, wherein the transfer initiation message identifies the first data record as an exclusive recipient data record.

11. A computer-implemented method, comprising:
receiving an authentication request to authenticate a first entity with a first service;
in response to receiving the authentication request:
identifying an access-restricted first data record associated with the first entity;
generating a message associated with a first transfer of resources between the first data record and a designated second data record, the message identifying one of the first and second data records as a recipient data record for the first transfer and defining a first quantity of resources to transfer; and
transmitting the message to a first server associated with the first entity, the first server requiring user authentication to access the message;
determining a completion status of the first transfer; and
generating a response to the authentication request based on the completion status of the first transfer.

12. The method of claim 11, wherein the first server comprises a messaging server associated with a messaging service that is independent of the first data record.

13. The method of claim 11, wherein the first server comprises a resource server associated with the first data record and wherein the first transfer comprises a transfer of resources via a real-time transfer rail.

14. The method of claim 11, wherein the message comprises a resource transfer request to cause the first transfer of resources to be initiated from the first data record to the second data record and wherein determining the completion status of the first transfer comprises:
receiving a response message associated with the resource transfer request; and
validating the response message.

15. The method of claim 14, wherein validating the response message comprises:
verifying that the response message is associated with the first entity; and
determining that the response message designates the first quantity of resources to be transferred to the second data record.

16. The method of claim 11, wherein determining the completion status of the first transfer comprises detecting transfer failure of the first transfer and wherein the response to the authentication request comprises a notification of the transfer failure.

17. The method of claim 16, wherein the transfer failure of the first transfer comprises at least one of:
an authentication failure of the entity at a messaging server associated with a messaging service; or
an authentication failure of the entity at a resource server associated with the first data record.

18. The method of claim 16, wherein detecting the transfer failure of the first transfer comprises determining that a time-out condition associated with the first transfer has occurred.

19. The method of claim 11, wherein the message comprises a transfer initiation message for transferring the first quantity of resources from the second data record to the first data record and wherein determining the completion status of the first transfer comprises determining that the first quantity of resources is received at the first data record.

20. The method of claim 19, wherein the transfer initiation message identifies the first data record as an exclusive recipient data record.

* * * * *